United States Patent [19]

Mollenauer

[11] Patent Number: 4,635,263

[45] Date of Patent: Jan. 6, 1987

[54] SOLITON LASER

[75] Inventor: Linn F. Mollenauer, Colts Neck, N.J.

[73] Assignee: AT&T Bell Laboratories, Murray Hill, N.J.

[21] Appl. No.: 851,274

[22] Filed: Apr. 10, 1986

Related U.S. Application Data

[63] Continuation-in-part of Ser. No. 518,683, Jul. 29, 1983, abandoned.

[51] Int. Cl.$^4$ .......................................... H01S 3/098
[52] U.S. Cl. ........................................ 372/3; 372/6; 372/18; 372/20; 372/25; 372/93; 350/96.15
[58] Field of Search ................... 372/6, 18, 20, 25, 93; 307/426; 350/96.15

[56] References Cited

U.S. PATENT DOCUMENTS

| 4,136,929 | 1/1979 | Suzaki ................... 372/6 |
| 4,493,528 | 1/1985 | Shaw et al. ........... 350/96.15 |
| 4,515,431 | 5/1985 | Shaw et al. ........... 372/6 |

*Primary Examiner*—James W. Davie
*Attorney, Agent, or Firm*—Daniel D. Dubosky; Michael J. Urbano

[57] ABSTRACT

A portion of the pulsed output of a 3-mirror, folded, astigmatically compensated cavity of a c.w., mode-locked, color center laser is coupled into a single-mode, polarization-preserving optical fiber. Following compression of the pulses by their propagation through the fiber, the shortened pulses, which take the form of essentially solitons, are fed back into the laser cavity so as to coincide and be in phase with the pulses in the laser cavity. Through the process of stimulated emission in the color center crystal, the injected pulses force the laser itself to produce shorter pulses of essentially the same shape as the solitons. Also described are embodiments employing a mode-locked semiconductor, fiber-Raman laser, and unidirectional pulse propagation in the fiber. Two of the fiber-Raman laser embodiments have separate gain and pulse shaping sections of optical fiber joined by an optical fiber directional coupler.

17 Claims, 9 Drawing Figures

SOLITON LASER

This application is a continuation-in-part of application Ser No. 518,683, filed July 29, 1983, abandoned.

BACKGROUND OF THE INVENTION

This invention relates to mode-locked lasers and, more particularly, to mode-locked lasers which use pulse narrowing and other soliton effects in an optical fiber to control the width and shape of the laser's output pulses.

Extremely short (e.g., picosecond) light pulses are produced by the process of mode-locking in dye, color center, and semiconductor lasers. However, the exact pulse width and shape are not always entirely under complete control. Instead, they are the incompletely understood product of many factors, such as the width and stability of the pump pulses, the gain of the active medium, precise cavity adjustment, and so on. Much effort has been devoted to the development of techniques for further shortening and stabilizing the output pulses. For example, mode-locked dye lasers (operating primarily at visible wavelengths) can be made to produce pulses as short as about 0.1 psec through the introduction of nonlinear absorbers into the cavity, although the resultant output powers are rather weak and problems of stability remain. However, the problem of pulse-width control remains particularly acute at near-infrared wavelengths, in part because of a paucity of suitable nonlinear absorbers in that region of the spectrum.

SUMMARY OF THE INVENTION

In accordance with my invention, the pulses of a mode-locked laser are shortened and stabilized by a length of low-loss, polarization-preserving, single-mode optical fiber which is introduced into the feedback loop of the laser. Initially, the fiber compresses the pulses, and the compressed pulses are injected into the mode-locked laser cavity essentially coincident and in phase with the laser pulses, thereby forcing the laser itself to generate shorter pulses. When equilibrium has been achieved, the pulses in the fiber will be essentially solitons. As a consequence, the laser pulse width will be highly stable.

In one of the embodiments of the invention, the laser apparatus consists almost entirely of optical fiber connected in a loop which is separated into two parts, a short gain section, and a longer, pulse shaping section. The sections are joined together by a first coupler which permits output pulses to be taken from the gain section and which couples pulses into the pulse shaping section, and a second coupler which permits pump pulses and the compressed pulses from the shaping section to be coupled into the gain section.

BRIEF DESCRIPTION OF THE DRAWING

My invention, together with its various features and advantages, can be readily understood from the following, more detailed description taken in conjunction with the accompanying drawings, in which.

DETAILED DESCRIPTION

Soliton Effects

Before discussing in detail my invention, it will be instructive to consider first the nature of pulse compression and solitons in optical fibers.

Pulse shaping in optical fibers results from the action, or interaction, of two things: (1) group velocity dispersion and (2) nonlinearity of the refractive index. At sufficiently low intensity, dispersion dominates, and the pulses are always broadened. Dispersion (of whatever sign) acting alone broadens pulses according to the formula:

$$\tau' = \tau\sqrt{1 + \left(\frac{1.47 LD}{\tau^2}\right)^2} \tag{1}$$

where $\tau$ is the input pulse width (FWHM) in psec, D is the dispersion parameter in psec/nm/km, and L is the fiber length in km.

Figure 1:
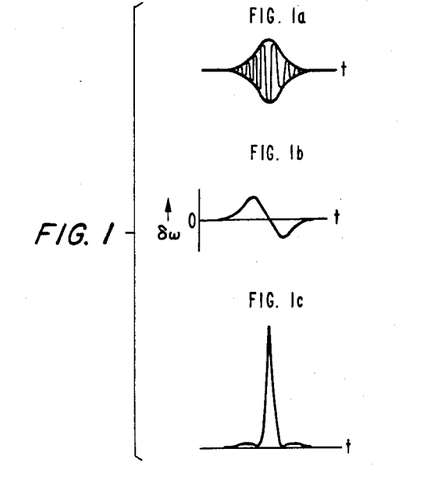
FIG. 1, Part (a) shows an optical pulse that has experienced self-phase modulation; Part (b) shows the corresponding frequency chirp—the frequencies in the leading half of the pulse are lowered while those in the trailing half are raised; Part (c) shows the compressed pulse which results because of action of the fiber's dispersion on the chirped pulse—the back of the pulse "catches up" with the front.

However, nonlinearity, working in conjunction with negative group velocity dispersion ($\partial v_g/\partial\lambda < 0$) allows for the possibility of pulse compression. The nonlinearity can be expressed as $$n = n_0 + n_2 I \tag{2}$$

where n is the refractive index, $n_0$ is its value at arbitrarily low intensity, I is the light intensity, and in quartz glass fibers $n_2$ has the value $3.2\times10^{-16}$ cm$^2$/W. As shown in FIG. 1, simple pulse compression takes place as follows. In Part (a) the self-phase modulation due to the nonlinearity tends to lower frequencies in the leading half of the pulse and to raise those in the trailing half. The frequency "chirp" is shown in Part (b). When such a "chirped" pulse is acted upon by the (already-indicated) negative group velocity dispersion, the leading (lower frequency) part is retarded, while the trailing (higher frequency) part is advanced and the pulse tends to collapse upon itself as shown in Part (c). The effect can be a powerful one. Input to output pulse width ratios of nearly 30:1 have been observed experimentally, and even greater compression has been predicted theoretically. See, L. F. Mollenauer et al, *Optics Letters*, Vol. 8, No. 5, p. 289 (1983).

Note that the degree of pulse compression is strongly dependent on the intensity. In fact, to obtain any compression at all, the rate of chirp buildup, and hence the intensity, must exceed a certain critical value, in order for the pulse broadening effects of dispersion alone to be overcome (see Eq. (1)). At that critical intensity, one has the fundamental soliton, a pulse that, in the limit of negligible loss, neither broadens nor narrows with propagation. See, L. F. Mollenauer et al, *Physical Review Letters*, Vol. 45, p. 1095 (1980). It can be shown that the critical power $P_1$ for a fundamental soliton is $$P_1 = \left( \frac{0.776 \lambda^3}{\pi^2 c n_2} \right) \frac{|D| A_{eff}}{\tau^2} \quad (3)$$

where $\lambda$ is the optical wavelength in a vacuum, $A_{eff}$ is the area of the fiber core, c is velocity of light, and the other parameters are as previously defined. Strictly speaking, the fundamental soliton also corresponds to a precise pulse shape: $\text{sech}^2(t/\gamma\tau)$ in intensity, where $\gamma$ has the numerical value 0.567. However, it can be shown that a pulse of any reasonable shape, and of approximately the right intensity, is soon converted by the fiber into an exact ($\text{sech}^2$) soliton. This phenomenon is discussed by L. F. Mollenauer et al in *Laser Focus*, p. 193-198 (1982).

Figure 2:
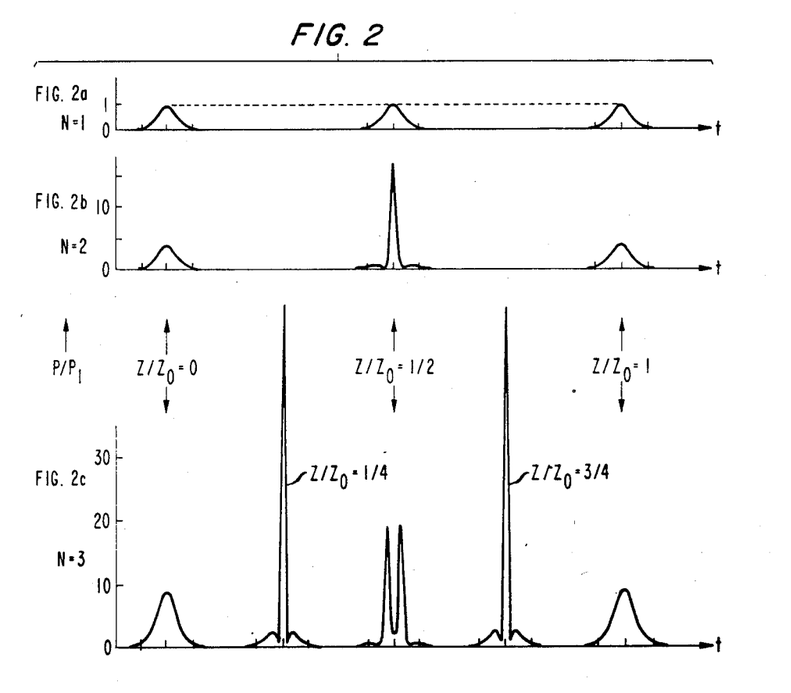
FIG. 2 shows the theoretical behavior of solitons with periodicity $Z_0$ as they propagate down a fiber as a function of power P launched into the fiber. In Part (a) the fundamental soliton (N=1) propagates without change in shape or amplitude; in Parts (b) and (c) higher order solitons (N=2, N=3) exhibit more complex behavior, undergoing sequences of narrowing and splitting.

Although the description given so far has been largely qualitative in nature, it should be noted that the various pulse shaping effects are predicted quantitatively by the nonlinear Schrodinger equation. In addition to simple compression and the fundamental soliton, these predicted (and experimentally verified) effects include so-called higher-order solitons, the pulses mentioned earlier whose behavior is periodic with propagation. The higher-order solitons occur for ($\text{sech}^2$) input pulses of peak power given by $$P_N = N^2 P_1 \quad (4)$$

where N is an integer. FIG. 2, Parts (b) and (c) show the behavior of the N=2 and N=3 solitons, in addition to the fundamental soliton, Part (a). The soliton period, $Z_0$, an important scale parameter even when higher solitons are not involved, is given by the formula:

$$Z_0 = 0.322 \left( \frac{\pi^2 c}{\lambda^2} \right) \frac{\tau^2}{|D|}. \quad (5)$$

Figure 3:
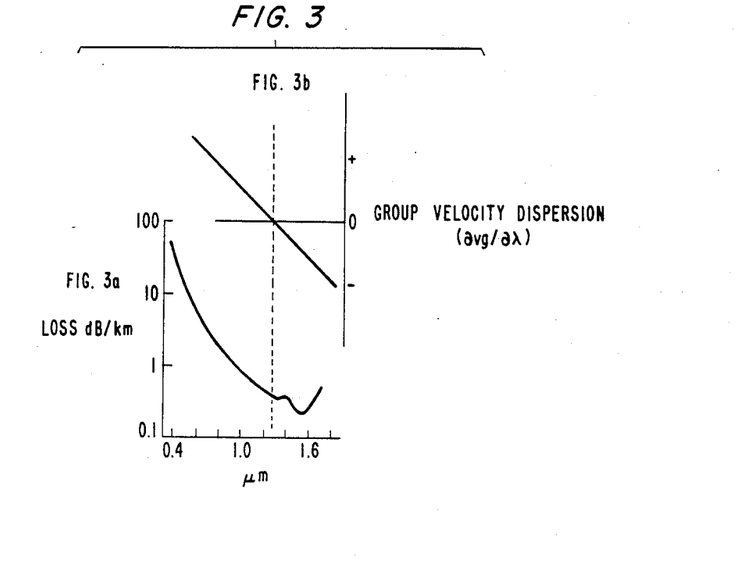
FIG. 3 shows the optical loss, Part (a), and group velocity dispersion, Part (b), as functions of wavelength for single mode fibers currently available.

It will be helpful to indicate some actual values of the above parameters. FIG. 3 shows both loss, Part (a), and group velocity dispersion, Part (b), as a function of wavelength for the best single-mode quartz glass fibers commercially available. Although the wavelength corresponding to zero dispersion can be shifted somewhat, the indicated value ($\lambda \sim 1.3$ $\mu$m) is typical. Thus, the soliton effects on which the invention is based usually occur for $\lambda > 1.3$ $\mu$m where $\partial v_g/\partial\lambda < 0$. (However, a very recent development has led to the possibility of creating negative dispersion over narrow regions just about anywhere in the optical transmission region.) For ordinary fibers, however, the extremely low loss region near $\lambda = 1.55$ $\mu$m is the best for observation and use of soliton effects. A typical value of the dispersion parameter for that wavelength is D=31 15 psec/nm/km, and a typical fiber core area is $A_{eff} \sim 10^{-6}$ cm$^2$. For those parameters and for $\tau=7$ psec FWHM input pulses, $P_1 \sim 1$ W and $Z_0 \sim 1300$ m. However, if $\tau$ is reduced to 1 psec, $P_1$ increases to $\sim 50$ W, while $Z_0$ reduces to $\sim 26$ m.

Soliton Laser

These soliton effects are exploited in accordance with my invention to force a mode-locked laser to generate short pulses of controlled width. To do so, the output pulses of the mode-locked laser are coupled through a length of single-mode, polarization-preserving fiber which, as described above, is adapted to compress pulses and to support solitons. The output of the fiber is fed back into the cavity of the mode-locked laser so that the injected pulses are essentially coincident and in phase with the cavity pulses.

Figure 4:
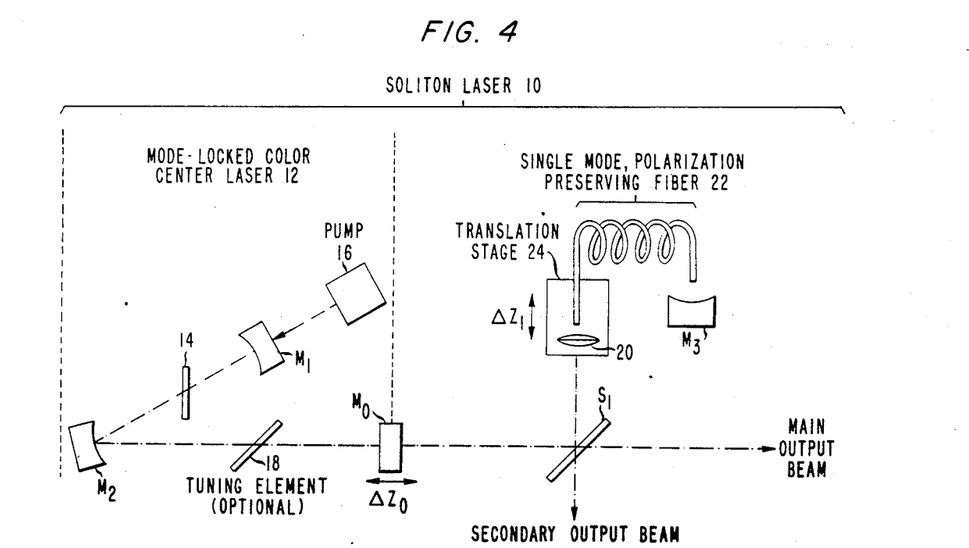
FIG. 4 is a schematic of a soliton laser, employing a mode-locked color center laser, in accordance with one embodiment of my invention.

The first soliton laser 10, shown schematically in FIG. 4, included a synchronously pumped, mode-locked color center laser 12 of the type described by L. F. Mollenauer et al, *Optics Letters*, Vol. 7, p. 414 (1982). The cavity of laser 12 was formed by $\sim 100\%$ reflectivity mirrors $M_1$ and $M_2$ and by a partially transmissive mirror $M_0$. The active medium 14, a color center crystal, was positioned between mirrors $M_1$ and $M_2$ and was pumped coaxially through dichroic mirror $M_1$ by an optical pump source 16 (e.g., a Nd:YAG laser operating at 1.064 $\mu$m when medium 14 is a KCl:Tl crystal containing Tl° (1) color centers). An optional wavelength tuning element 18, such as a birefringence plate, may be inserted between mirrors $M_2$ and $M_0$. Beam splitter $S_1$ and the microscope objective 20 served to coupled a portion of the output of laser 12 into one end of a single-mode polarization-preserving fiber 22 of length $Z_1$. At the other end a $\sim 100\%$ reflectivity mirror $M_3$ reflected the pulses back into the fiber. Following compression by their double pass through the fiber, the pulses were fed back into the cavity of laser 12 by way of the same path. Through the process of stimulated emission in the active medium 14, the injected pulses forced the laser 12 to produce considerably shorter pulses. To support solitons, the fiber 22 was required to have sufficiently low loss, and the fraction of power coupled into the fiber 22 via beam splitter $S_1$, had to be such that the peak pulse power was that required for the fundamental, or for the N=2, solitons (see Eq. (3)).

It should be noted that tuning element 18 can be used to tune the color center laser from $\lambda \sim 1.4$ to $\sim 1.6$ $\mu$m. At band center ($\sim 1.5$ $\mu$m), without feedback from the fiber 22, the color center laser 12 produced $\sim\text{sech}^2$ pulses of $\sim 8$ psec or greater width. With the fiber feedback scheme, however, the pulse widths were reduced to $\sim 2$ psec or less.

Several conditions should be met in order to achieve such operation of the soliton laser. First, pulses from the fiber should arrive at $M_0$ essentially simultaneously with the cavity pulses of laser 12. This condition means that the optical path, from $M_0$ via $S_1$ through the fiber 22 and back again to $M_0$, must be an integral multiple of 2L, where L is the length of the cavity of laser 12. The necessary adjustment is achieved in two steps: Beginning with an arbitrary length of fiber, the time difference between pulses directly from the laser 12 and those returning from the fiber 22 (and reflected by $M_0$) is noted through use of a fast detector and a fast oscilloscope (not shown). With this information, the fiber length can then be trimmed to be within about ±10 mm of the correct length. Final adjustment ($\Delta Z_1$) is achieved through motion of the input fiber end and microscope objective, both mounted on a common translation stage depicted schematically at 24.

It should be noted that, although the adjustment ($\Delta Z_0$) of $M_0$ (for best mode-locking with synchronous pumping) is required to be precise to within a few $\mu$m, much larger variations (up to several mm) are allowed in $\Delta Z_1$. The higher tolerance to $Z_1$ variations is rooted in the large group velocity dispersion of the fiber: that is, a relatively small change in wavelength will change the equivalent free space path length of the fiber, thereby automatically compensating for the error in $\Delta Z_1$. The wavelength and path length changes are related as follows:

$$\delta\lambda = (6.66\Delta Z_1)/(Z_1 D) \tag{6}$$

where $\delta\lambda$ is in nm, $\Delta Z_1$ in mm, and the product $Z_1 D$ is in psec/nm. Thus, it may well be possible to eliminate all tuning elements (e.g., 18) in the cavity of laser 12 and to use instead the variation $\Delta Z_1$ to provide wavelength tuning via Eq. (6).

The second requirement is that the pulses returning from the fiber 22 be essentially in phase with those already in the cavity of laser 12. In a laser having large enough thermal and mechanical stability the length of the two cavities may be adjusted to achieve this requirement. Alternatively, the position of mirror $M_3$ may be constantly adjusted by an electro-optic servosystem to obtain the proper relative cavity lengths.

The third adjustment that should be made relates to the degree of coupling between the cavity of laser 12 and the feedback loop including fiber 22. The coupling is, of course, directly proportional to the reflectivity of beam splitter $S_1$. It can further and continuously be controlled (reduced) by defocusing of the microscope objective 20. Of course, on the other hand, the coupling must be sufficiently high that the pulses from the fiber 22 can gain control of the pulses in the cavity of laser 12. In this regard, it has been found empirically that a remarkably small fraction of the output of laser 12—on the order of a few tenths of a percent—is usually sufficient. On the other hand, too large a coupling seems to lead to unstable operation, and an apparent quenching of the desired effect, although this phenomenon is not yet well understood.

Figure 5:
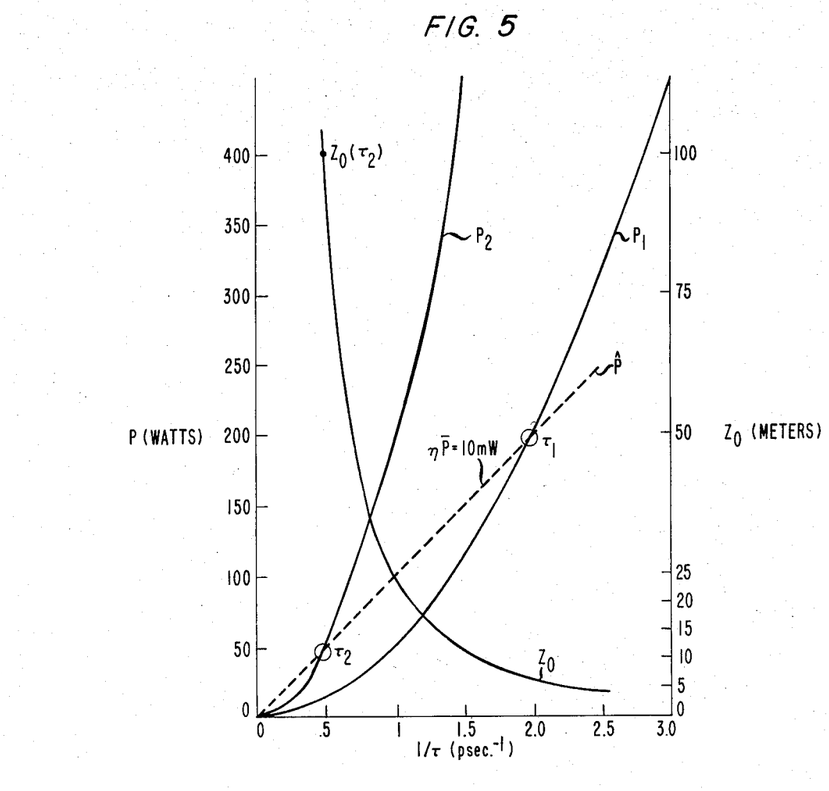
FIG. 5 shows power P versus the reciprocal of pulse width $\tau$ for the fundamental soliton $P_1$, the N=2 soliton $P_2$, and the peak power P in the fiber. $Z_0$ is the soliton period.

Approach of laser operation to equilibrium can perhaps be best understood through reference to FIG. 5, where various quantities are plotted as a function of $1/\tau$, the reciprocal pulse width, for an assumed operating wavelength of 1.5 $\mu$m, D=15 psec/nm/km, and $A_{eff} = 10^{-6}$ cm$^2$. Note that $P_1$ (Eq. (3)) is quadratic in $1/\tau$. P refers to the peak pulse power in the fiber. For a steady time average output power of the laser, and a fixed degree of coupling of that power into the fiber, one has $$P \cong \eta \bar{P}(T/\tau) \tag{7}$$

where $\eta$ in the degree of coupling, $\bar{P}$ the time-average output power of the laser, and T the period between pulses. Thus, P is directly proportional to $1/\tau$. The curves for $P_1$ and P intersect at a point corresponding to $\tau_1$. It is now easy to see why operation at or near $\tau_1$ should be stable. If $\tau > \tau_1$, then $P > P_1$, and the fiber will narrow the pulses, tending to drive the laser to produce shorter pulses. This phenomenon can be understood by reference to FIG. 2. For N=2, $P/P_1 = 4$ results in pulse narrowing. Similarly, for N=3, $P/P_1 = 9$ also results in pulse narrowing. The same effect occurs for any $P/P_1 > 1$. On the other hand, if $\tau < \tau_1$, then $P < P_1$, and the fiber will broaden the pulses, with corresponding effect on the laser 12.

Note that the pulse width $\tau_1$ is inversely proportional to the quantity $\eta \bar{P}$. Thus, the laser pulse width is adjustable over a considerable range through adjustment of the beam splitter coupling ($\eta$) or of the laser power $\bar{P}$, or both.

There are other possible stable modes of operation. Consider, for example, the point in FIG. 5 where the curve of P crosses the curve of $P_2$. Call the pulse width corresponding to this crossover $\tau_2$. Furthermore, let the double fiber length correspond to the soliton period ($Z_0$) for $\tau_2$. For $\tau > \tau_2$, one then has pulse narrowing, but as $\tau$ is reduced toward $\tau_2$, the pulse narrowing ceases by virtue of the periodicity of the N=2 soliton (FIG. 2). If, furthermore, the pulses are restricted by means external to the fiber (such as a narrow band tuning element in the laser) from narrowing beyond $\tau \cong \tau_2$, then operation with $\sim$N=2 solitons and $\tau \cong \tau_2$ can be stable. In fact, my observations indicate that the first demonstration of a soliton laser (described above) operated in the N=2 soliton mode. For an actual fiber length of about $\times$m (double length $\sim$66 m), $\tau_2$ is calculated as about 1.7 psec which corresponds well to the measured pulse width of $\sim$2 psec.

In later experiments even shorter pulse widths down to 130 femtoseconds in duration have been obtained with the shorter pulse width corresponding to a 0.2 meter fiber length. These experiments have shown that the pulse width scales approximately with the square root of the pulse length. This is what would be expected for the operation using N=2 solitons. See FIG. 4 and related materials in the article entitled "The Soliton Laser" by L. F. Mollenauer and R. H. Stolen, *Optics Letters*, Vol. 9, p. 13, January 1984; also see FIG. 7 and related material in the article entitled "Solitons in Optical Fibers and the Soliton Laser", by L. F. Mollenauer, *Phil. Trans. Royal Soc. London*, A315, 437–450 (1985).

Alternative Embodiments

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

For example, the optical fiber could be replaced by a single-mode, polarization-preserving optical waveguide of another type, such as a thin film dielectric waveguide.

In some cases, it should be possible to eliminate $M_0$, thereby making the fiber an intracavity device with $M_3$ forming one end of the cavity. Such an arrangement might be especially appropriate for use with a high gain, low-power semiconductor laser; that is, the output power of such a laser is typicaly low enough (10's of mW) that the attenuation provided by a beam splitter is not required to produce fundamental or N=2 solitons in the fiber.

Figure 6:
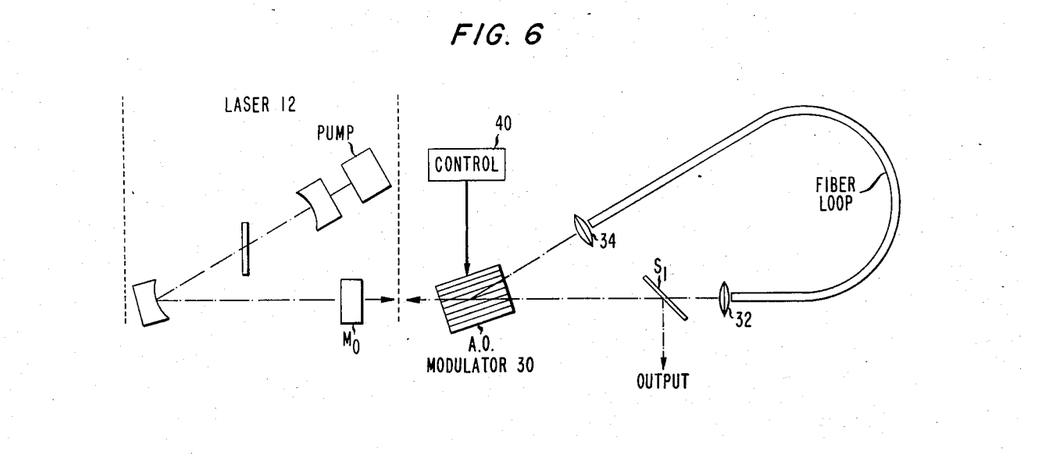
FIG. 6 is a schematic of a soliton laser in accordance with an alternative embodiment of my invention in which the feedback loop is adapted so that pulses propagate through the fiber in a single direction.

In addition, the invention is not to be limited to those configurations in which the pulses travel in both directions in the fiber. A one-way, or traveling wave, configuration is also possible as shown in FIG. 6. The pulses from laser 22 are passed through an acousto-optic modulator 30. The latter is driven by a well-known control circuit 40. In one state, when the standing waves in the modulator are at null, all of the energy of laser 12 is directed toward the beam splitter $S_1$ and into one end of the fiber through lens 32. In a later state (about a half-period later would be best), the standing waves in the modulator are at or near their maximum, and a large fraction of the energy returning from the fiber (through lens 34) is coupled back into the laser 12. Note that in addition to providing for one-way pulse travel in the fiber, this arrangement allows the coupling back of energy into the laser 12 to be independent of the degree of coupling into the fiber. Thus, it is possible to obtain more feedback for a given intensity level in the fiber.

Figure 7:
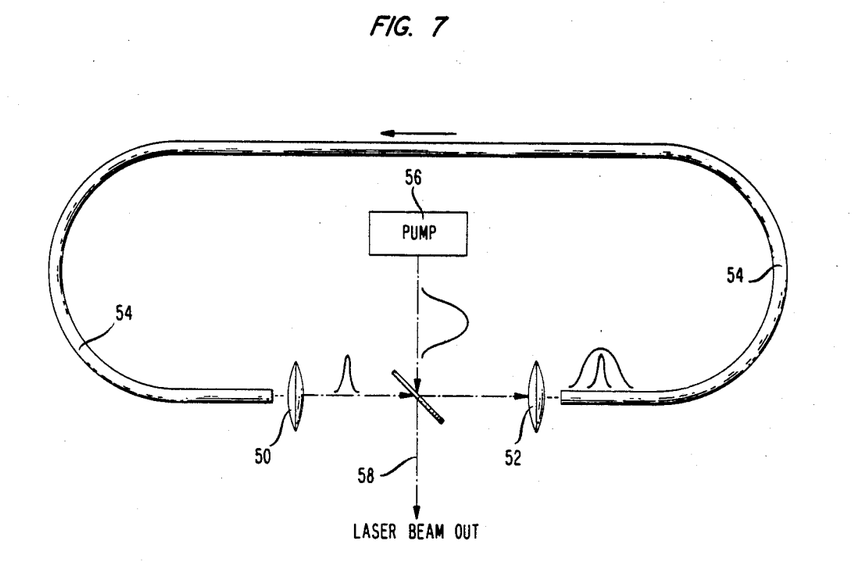
FIG. 7 is a schematic of another embodiment of my invention in which the fiber itself includes the gain medium (Raman gain)

In another embodiment, the fiber itself could include the gain medium (Raman gain) as described by R. H. Stolen et al in *Applied Physics Letters*, Vol. 22, p. 276 (1973). In the latter case, the core and adjacent regions of the cladding experience gain, whereas the peripheral cladding regions typically do not. To avoid problems of walkoff caused by group velocity dispersion (i.e., periods of non-overlap of the pump and laser pulses), the pump pulses may have to be relatively broad pulses, or else the pump should be c.w. One illustration of such a laser is shown in FIG. 7.

Microscope objectives 50 and 52 couple the two ends of a single-mode, polarization-preserving fiber 54 together, with a short space between for insertion of a dichroic beam splitter S and possible tuning elements (not shown). The beam splitter S serves both to couple in the synchronous pump pulses from pump laser 56 and to couple out the laser pulses at 58. Illustratively, the beam splitter would have about 100% reflectivity at the pump wavelength and about 10% reflectivity at the laser wavelength.

Both the pump and laser (Stokes) pulse circulate counterclockwise in the fiber loop. The length of the loop is adjusted so that the transit time for laser pulses around the loop is an integral multiple of the period between pump pulses. Since the laser is synchronously pumped, the period between the pump pulses and the period between the laser pulses are essentially the same. Once again, group velocity tuning could be used.

In a fiber Raman laser, the gain is $$g = \exp(\Gamma Z) \tag{8}$$

where Z is the distance along the fiber and the gain coefficient $\Gamma$ scales as $$\Gamma \alpha \frac{P_p}{\lambda_S A_{eff}} \tag{9}$$

$P_P$ is the peak pump power, $\lambda_S$ is the Stokes (laser pulse) wavelength, and $A_{eff}$ is the effective fiber core area. To cite a specific example, let $\lambda_S \sim 1.5$ $\mu$m, $\lambda_P \sim 1.4$ $\mu$m (e.g., a color center or semiconductor laser), let the fiber core (silica glass) have a diameter of 8 $\mu$m, and let the fiber loop length (Z) be 100M. Then, $g = e^{0.1} \sim 1.1$ for $P_P \sim 0.8$ W. Since the required gain at threshold is also about $g = 1.1$ for the laser shown in FIG. 7, a pump power of just a few watts would be sufficient for operation well above threshold. For shorter fibers or for greater degrees of output coupling, correspondingly higher pump powers would be required. But peak pump powers of even hundreds or thousands of watts are readily available from various mode-locked lasers that could be used as the pump source.

The output power available from the embodiment shown in FIG. 7 is limited in that the pulse cannot be amplified to one of the higher ordered soliton powers and travel through a significant length of fiber without encountering a narrowing of the pulse width. Accordingly for those applications which require higher output powers in the order of two or three times the fundamental soliton power the embodiments shown in FIGS. 8 and 9 may be preferable.

Figure 8:
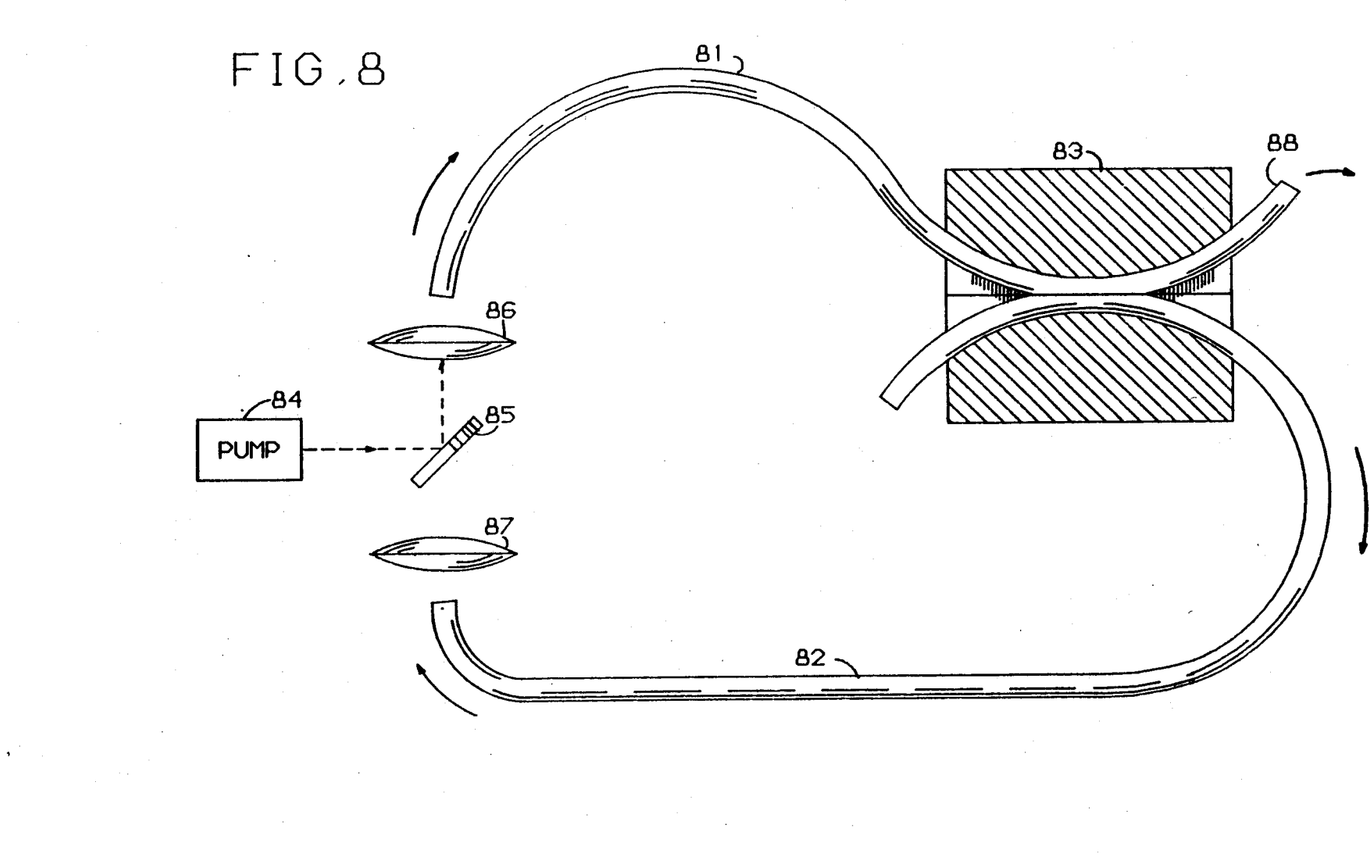
FIGS. 8 and 9 are still other embodiments of my invention where the fiber includes the gain medium (Raman gain), but in these embodiments a pulse shaping section of fiber is separated from a gain section of fiber by an optical fiber directional coupler.

In FIG. 8, a soliton ring laser is shown wherein the optical fiber loop consists of two sections, a short optical fiber 81 to provide gain and a longer optical fiber 82 to provide pulse shaping. The sections are joined to each other by an optical fiber directional coupler 83 of the type disclosed in U.S. Pat. No. 4,493,528 issued to H. J. Shaw et al. Jan. 15, 1985. In addition a source of pump pulses 84 is coupled by way of a dichroic mirror 85 through a microscopic lens 86 such that pump pulses are delivered into optical fiber 81. Soliton pulses coming out of the pulse shaping section provided by optical fiber 82 are coupled by way of the microscopic objective lens 87 so that they are transmitted through dichroic mirror 85 and through lens 86 into fiber 81. The pump pulses operate on the soliton pulses in optical fiber 81 through the Raman gain coefficient in order to amplify the soliton pulses. The end of fiber 82 and adjacent lens 87 or the end of fiber 81 and adjacent lens 86 may be mounted on a movable stage such that the loop transit time can be modified to match the period between pump pulses from source 84. This insures that the pump pulses will overlap the soliton pulses when they are present within optical fiber 81. Alternatively, the period between pulses from source 84 may be changed to match the loop transit time encountered by the soliton pulses.

Fiber 81 may be fabricated such that its zero dispersion wavelength is between the wavelength of the pump pulses from source 84 and the wavelength of the soliton pulses in fiber 81. By choosing the position of the zero dispersion wavelength, the group velocity encountered by each of the wavelenghts may be made sufficiently different such that the pump pulses walk-off the soliton pulses by the time they have traveled the entire length of fiber 81. As a result the pump and soliton pulses are not coincident after they have passed into the pulse shaping fiber 82 and this fiber may serve solely for the purpose of shaping the soliton pulses. With this selection of the zero dispersion wavelength, the directional coupler 83 need not be made wavelength dependent and it may be constructed so that it cross-couples each of the wavelengths with equal efficiency. It should be constructed, however, with the proper cross-coupling efficiencies such that the soliton pulses are cross-coupled from fiber 81 into fiber 82 with a soliton pulse having a power of $P_1$ at the input of fiber 82. The remaining power which may be as great as several times $P_1$ may be delivered by coupler 83 to the output fiber 88.

Directional coupler 83 may also be constructed so that it cross-couples a fundamental soliton pulse having a power of $P_1$ into fiber 82 but cross-couples virtually no power at the wavelength corresponding to the pump pulses. This type of wavelength-dependent optical fiber directional coupler may be fabricated using the formulas set forth in the article entitled "Directional-Coupler Filter Using Dissimilar Optical Fibers" by D. Marcuse, *Electronics Letters,* Aug. 15, 1985, Vol. 21, No. 17, pages 726–727. With this wavelength-dependent coupler the pump pulses and soliton pulses may encounter the same group velocity within fiber 81 since there is no necessity to insure that the pump pulses are displaced in time from the soliton pulses at the end of fiber 81.

The sole objective of the gain section provided by optical fiber 81 is to increase the peak power of the pulse without significantly altering its width or shape. The length of optical fiber 81 must be chosen very carefully to insure that the soliton pulses do not encounter any significant narrowing due to their higher amplitudes of power. As shown in FIG. 2 the soliton pulses corresponding to orders higher than N=1 do undergo a significant narrowing as they proceed through a fiber. The point in the fiber where the pulse encounters a minimum width can be expressed as $Z_{min}$ by the following equation:

$$Z_{min} = \frac{Z_0}{2(N-1)} \quad (10)$$

where N is the soliton number. The pulse width has a dependence on the ratio $Z/Z_{min}$ that is roughly cosine shaped, that is to say the pulse width does not change very much in a length of fiber corresponding to about 1/5 of $Z_{min}$. Considering that a soliton pulse of N=1 is emitted from optical fiber 82 and passes through dichroic mirror 85 before it enters fiber 81, it will enter fiber 81 with a power less than that corresponding to N=1 due to loss in the dichroic mirror 85. The amplification which takes place in fiber 81 is roughly exponential in that powers corresponding to the N=2 or N=3 orders of soliton are not encountered except in the last ⅓ of the length of optical fiber 81. Using these rough criteria we can determine that the maximum acceptable length, L, for optical fiber 81 that can be utilized before the significant narrowing takes place can be expressed by the following equation:

$$L \leq 0.3 \frac{Z_0}{(N-1)} \quad (11)$$

Equations 10 and 11 can be utilized in combination with the equation 8 which expresses the gain encountered due to the Raman gain coefficient in order to choose the proper length of optical fiber 81, taking the losses of both dichroic mirror 85 and the directional coupler 83 into account. Using ordinary silica fiber, soliton pulses having powers corresponding to the N=2 order of soliton can easily be achieved at the input of coupler 83 thereby permitting a soliton pulse having a power corresponding to three times the fundamental to be delivered to the output fiber 88. In order to achieve even greater efficiencies of output pulse power to pump pulse power, it may be advantageous to use an optical fiber for fiber 81 having a high Raman gain coefficient, for example fibers having germania doping. See, for example, the article entitled "The relative Raman cross sections of vitreous $SiO_2$, $GeO_2$, $B_2O_3$, and $P_2O_5$" by F. L. Galeener et al., *Applied Phys. Lett.,* 32, Jan. 1, 1978, pp. 34–36. In these type fibers the Raman gain coefficient can be increased by as much as thirty times over that for a fused silica core fiber. As a result soliton pulses having powers that are in the same order of magnitude as the pump pulses can be achieved.

Figure 9:
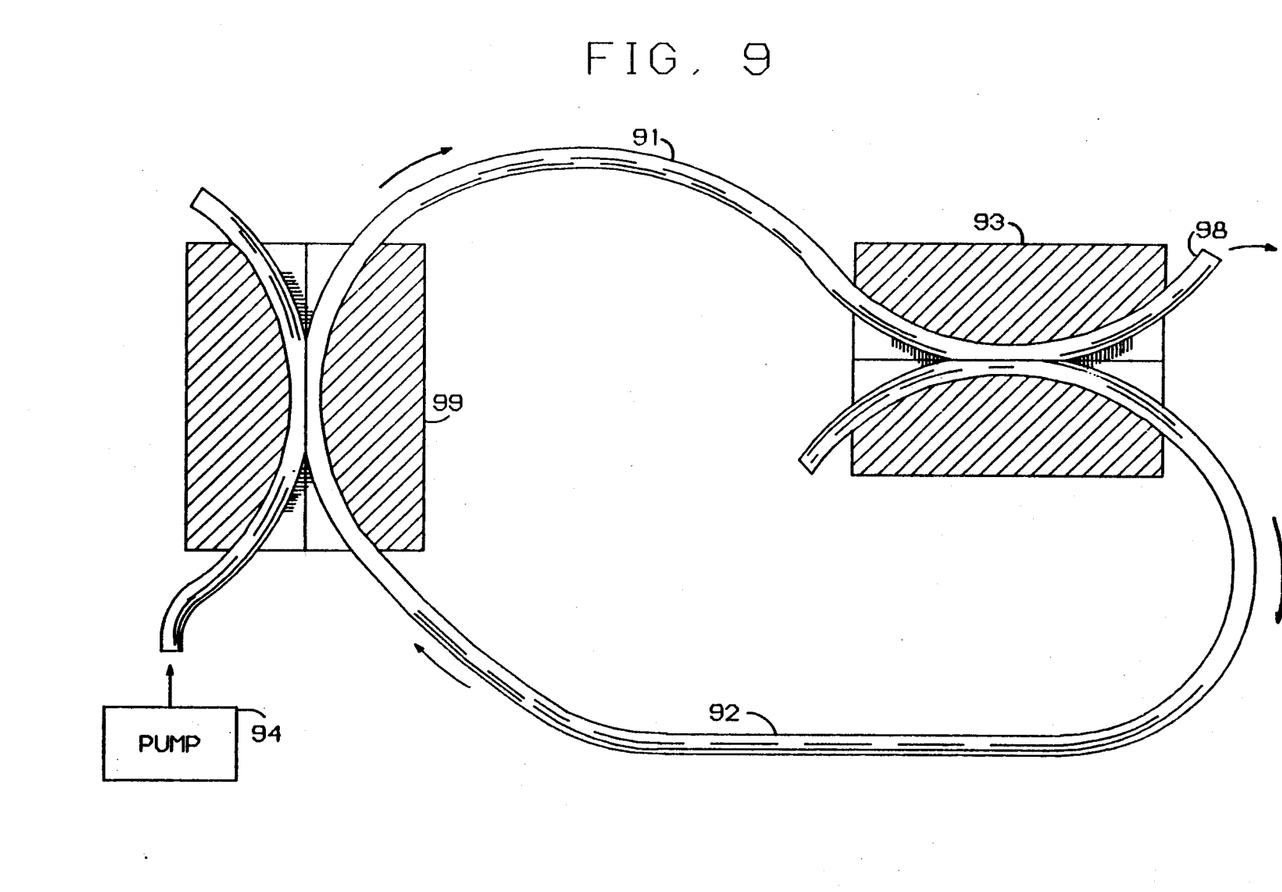

Still another embodiment wherein the gain section of optical fiber and pulse shaping section of optical fiber are separated is shown in FIG. 9. In this embodiment optical fiber 91 serves as the gain section and is coupled by way of directional coupler 93 to the pulse-shaping optical fiber 92. The pump pulses from source 94 however, are coupled into fiber 91 by way of a second directional coupler 99. This directional coupler 99 may be made wavelength dependent such that it cross-couples the pump pulses with a maximum efficiency into fiber 91 whereas it permits virtually no cross-coupling of the soliton pulse out of fiber 92 thereby causing the soliton pulse to be connected with maximum efficiency into fiber 91. By eliminating the dichroic mirror used in the FIG. 8 embodiment, the embodiment shown in FIG. 9, which uses only optical fiber and directional couplers of the type disclosed in the above-identified Marcuse article, results in an easily manufacturable and compact soliton ring laser.

What is claimed is:

1. In a laser, apparatus comprising
a laser active medium for generating optical radiation at a predetermined wavelength,
means for generating mode-locked optical first pulses from said medium,
an essentially single-mode, polarization-preserving optical waveguide which is capable of supporting solitons at said predetermined wavelength, and
means for causing said first pulses to propagate through said waveguide thereby shortening the duration of said first pulses, and for causing at least a portion of the power of said shortened pulses to be coupled back into said active medium essentially coincident and in phase with said first pulses, thereby causing said active medium to generate pulses of shortened duration.

2. The laser of claim 1 wherein
said generating means includes means forming an optical cavity resonator, said active medium being positioned in said resonator, and means for providing egress of said first pulses from said resonator, and
said causing means includes a coupler for coupling a portion of the power of said first pulses into one end of said waveguide and means positioned at the other end of said waveguide for reflecting pulses emanating therefrom back into said waveguide.

3. The laser of claim 1 wherein
said generating means includes means forming an optical cavity resonator, said active medium being positioned in said resonator, and means for providing egress of said first pulses from said resonator, and
said causing means includes an optical modulator coupled to said generating means and to both ends of said waveguide, so that pulses in said waveguide propagate in a single direction, said modulator having one state in which a relatively large fraction of the power of said first pulses is coupled into said waveguide and a second state in which a relatively large fraction of the power of said shortened pulses is coupled back into said resonator.

4. The laser of claims 1, 2 or 3 including means for changing the equivalent free space path length of said waveguide, thereby tuning the wavelength of said laser.

5. The laser of claim 1 wherein
said active medium is in said waveguide,
said waveguide is formed in a loop,
said causing means includes means for coupling said first pulses into said loop for propagation in a single direction through said waveguide to generate said shortened pulses in said loop, and further includes means for coupling a portion of the power of said shortened pulses out of said loop, and
the length of said loop being adpated so that the transit time of said shortened pulses around said loop is essentially an integral multiple of the period between said first pulses.

6. The laser of claims 1, 2, 3 or 5 wherein said waveguide is an optical fiber.

7. The laser of claims 1, 2, 3 or 5 wherein said waveguide is characterized by a nonlinear refractive index and a negative group velocity dispersion at said predetermined wavelength.

8. A soliton laser comprising
a mode-locked laser for generating first optical pulses at a predetermined optical wavelength,
an essentially single-mode, polarization-preserving optical waveguide characterized by a nonlinear refractive index and a negative group velocity dispersion at said predetermined wavelength,
means for coupling a portion of the power of said first pulses into said waveguide so as to convert said first pulses into essentially solitons, and
means for feeding back said solitons into said mode-locked laser so that said solitons and said first pulses are essentially coincident and in phase with one another, thereby forcing said mode-locked laser itself to generate pulses of essentially the same shape as said solitons.

9. A laser apparatus for generating optical radiation at its output at a predetermined wavelength in response to pump pulses at its input comprising a gain medium for amplifying said optical radiation in response to said pump pulses, an essentially single-mode polarization-preserving optical waveguide which is capable of supporting solitons at said predetermined wavelength, first coupling means for coupling said optical radiation at a predetermined wavelength from said gain medium both to said output and to said optical waveguide, and second coupling means for coupling said pump pulses and said optical radiation from said optical waveguide into said gain 10. A laser apparatus as defined in claim 9 wherein said gain medium is a fiber waveguide having a Raman gain coefficient such that it will amplify radiation at said predetermined wavelength when pumped by said pump pulses.

11. A laser apparatus as defined in claim 9 wherein said first coupling means is a directional coupler having a cross-coupling efficiency at said predetermined wavelength that is less than unity.

12. A laser apparatus as defined in claims 10 or 11 wherein said second coupling means s a dichroic mirror having a reflectivity much less than one at said predetermined wavelength.

13. A laser apparatus as defined in claims 10 or 11 wherein said second coupling means is a directional coupler having a significant cross-coupling efficiency at the wavelength of said pump pulses and a substantially zero cross-coupling efficiency at said predetermined wavelength.

14. A laser apparatus for generating optical radiation at its output at a predetermined wavelength in response to pump pulses at its input comprising a first and second section of optical fiber waveguide, said first section of optical fiber waveguide having a Raman gain coefficient such that it will amplify radiation at said predetermined wavelength when pumped by said pump pulses, said second section being an essentially single-mode polarization-preserving optical waveguide which is capable of supporting soliton pulses at said predetermined wavelength, first coupling means for coupling radiation out of said first section both to said output and into said second section, and second coupling means for coupling soliton pulses out of said second section and said pump pulses at said input into said first section.

15. A laser apparatus as defined in claim 14 wherein said first coupling means comprises an optical fiber directional coupler having a cross-coupling efficiency at said predetermined wavelength that is less than unity.

16. A laser apparatus as defined in claim 15 wherein said second coupling means comprises a dichroic mirror having a reflectivity at said predetermined wavelength that is much less than one.

17. A laser apparatus as defined in claim 15 wherein said second coupling means comprises a second optical fiber directional coupler having a cross-coupling efficiency at said predetermined wavelength that is substantially equal to zero.

* * * * *